(12) United States Patent
Yoo et al.

(10) Patent No.: US 11,234,565 B2
(45) Date of Patent: Feb. 1, 2022

(54) DRYER AND HOLDER

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 181 days.

(21) Appl. No.: 16/576,393

(22) Filed: Sep. 19, 2019

(65) Prior Publication Data

US 2020/0085256 A1 Mar. 19, 2020

Related U.S. Application Data

(60) Provisional application No. 62/733,478, filed on Sep. 19, 2018.

(30) Foreign Application Priority Data

Feb. 25, 2019 (KR) .......................... 10-2019-0022027

(51) Int. Cl.
| | | |
|---|---|---|
| *A45D 20/00* | (2006.01) | |
| *A47K 10/48* | (2006.01) | |
| *A45D 20/12* | (2006.01) | |
| *H02J 7/00* | (2006.01) | |
| *H02J 9/00* | (2006.01) | |

(52) U.S. Cl.
CPC .............. *A47K 10/48* (2013.01); *A45D 20/12* (2013.01); *H02J 7/0029* (2013.01); *H02J 9/005* (2013.01); *A45D 2020/128* (2013.01)

(58) Field of Classification Search
CPC ........ A47K 10/48; A45D 20/12; A45D 20/30; A45D 20/08; A45D 20/10; A45D 20/14; A45D 2020/128; A45D 2020/126; H02J 7/0029; H02J 7/0063; H02J 9/005;
(Continued)

(56) References Cited

U.S. PATENT DOCUMENTS

| | | | |
|---|---|---|---|
| 8,146,264 B1 | 4/2012 | Stefano et al. | |
| 2019/0142132 A1* | 5/2019 | Nelson | .............. H02J 7/0016 34/96 |
| 2020/0352304 A1* | 11/2020 | Rocha | .............. A45D 20/14 |

FOREIGN PATENT DOCUMENTS

CA    2273828 A1    5/1998

* cited by examiner

*Primary Examiner* — John P McCormack
(74) *Attorney, Agent, or Firm* — Birch, Stewart, Kolasch & Birch, LLP (57) ABSTRACT

A dryer includes a plurality of first electronic parts including a fan and a heater, a first battery to supply power to the first electronic parts, and a first controller to control power of the first battery. The first controller detects a charging ratio of the first battery, enters a first power saving mode if the charging ratio is a threshold charging ratio or less, and limits power supplied to at least one of the plurality of first electronic parts. A holder for holding the dryer includes a plurality of second electronic parts including a plurality of contact terminals, a second battery to supply power to the second electronic parts, and a second controller to detect a charging ratio of the second battery and enter a second power saving mode to limit power supplied to at least one of the plurality of second electronic parts.

17 Claims, 6 Drawing Sheets

(58) Field of Classification Search
CPC ....... Y02B 70/30; Y04S 20/20; F24H 3/0405; F24H 9/2071; F24H 9/0052; F24H 9/06
USPC ..................................................... 34/96, 283
See application file for complete search history.

DRYER AND HOLDER

CROSS REFERENCE TO RELATED APPLICATIONS

This application claims the priority benefit of U.S. Provisional Application No. 62/733,478, filed on Sep. 19, 2018, and Korean Patent Application No. 10-2019-0022027, filed on Feb. 25, 2019, the entire disclosures of all of which are hereby expressly incorporated by reference into the present application.

BACKGROUND OF THE DISCLOSURE

Field of the Disclosure

The present disclosure relates to a dryer for drying a given object by discharging heated air, and a holder on which the dryer is held. More particularly, the present disclosure relates to a dryer and a holder in which a supply of power is limited based on a charging ratio of a battery included in the dryer and the holder.

Description of the Related Art

In order to freely perform drying without a physical restriction attributable to the length of an electric wire and a location of an electric socket, there is a need for a dryer or a dryer holder equipped with internal power capable of replacing external power.

Additionally, there is a need for a power control design in which limited internal power can be effectively used in order to perform drying without supplying external power.

SUMMARY OF THE DISCLOSURE

A first aspect of the present disclosure is to provide a dryer in which internal power can be effectively used.

A second aspect of the present disclosure is to provide a holder in which internal power can be effectively used.

Other objects to be solved by the present disclosure may be sufficiently derived from the description regarding embodiments of the present disclosure.

In one aspect, a dryer limits a supply of power based on a charging ratio of a first battery included in the dryer.

Specifically, the dryer includes a plurality of first electronic parts including a fan and a heater that consume power, a first battery configured to supply power to the first electronic parts, and a first controller configured to control power of the first battery.

The first controller detects a charging ratio of the first battery, enters a first power saving mode if the charging ratio is a threshold charging ratio or less, and limits power supplied to at least one of the plurality of first electronic parts in the first power saving mode.

The first controller may be configured to classify the first electronic parts into a first power retention part and a first power restriction part, and to retain a supply of power to the first power retention part and to limit a supply of power to the first power restriction part in the first power saving mode.

The dryer further includes a display device. The first controller may display, on the display device, the first power restriction part to which the supply of power is limited in the first power saving mode.

The first controller may again supply power to a first power restriction part that belongs to the first power restriction parts displayed on the display device and that has been excluded.

The first controller may classify the first power restriction part by a power restriction sequence.

When the first controller enters the first power saving mode, the first controller may limit a supply of power to the first power restriction part according to the power restriction sequence based on a drop in the charging ratio.

When the first controller enters the first power saving mode, the first controller may limit performance of the first power retention part based on a drop in the charging ratio.

In another aspect, a holder includes a plurality of second electronic parts consuming power including contact terminals for holding a dryer and transferring power to the dryer, a second battery configured to transfer power to the plurality of second electronic parts, and a second controller configured to control power of the second battery. The second controller detects a charging ratio of the second battery, enters a second power saving mode if the charging ratio is a threshold charging ratio or less, and limits power supplied to at least one of the plurality of second electronic parts in the second power saving mode.

The second controller may be configured to classify the second electronic parts into a second power retention part and a second power restriction part, and to retain a supply of power to the second power retention part and limit a supply of power to the second power restriction part in the second power saving mode.

The second controller may be configured to classify the contact terminals as the second power retention part if the dryer is held in the holder, and configured to classify the contact terminals as the second power restriction part if the dryer is not held in the holder.

Means for solving problems that have not been described above may be sufficiently derived from the description regarding embodiments of the present disclosure.

DESCRIPTION OF EXEMPLARY EMBODIMENTS

The advantages and features of the present disclosure and a method of achieving them will become apparent with reference to the embodiments described in detail below together with the accompanying drawings. However, the present disclosure is not limited to the embodiments set forth herein but may be embodied in many different forms, and these embodiments are provided so that the disclosure of the present disclosure is complete and that those skilled in the art will fully understand the scope of the present disclosure, and the present disclosure is only defined by the scope of the claims. Like reference numerals designate like elements throughout the specification.

A dryer 1 and a holder 100 according to embodiments of the present disclosure are described below with reference to the accompanying drawings.

Figure 1:
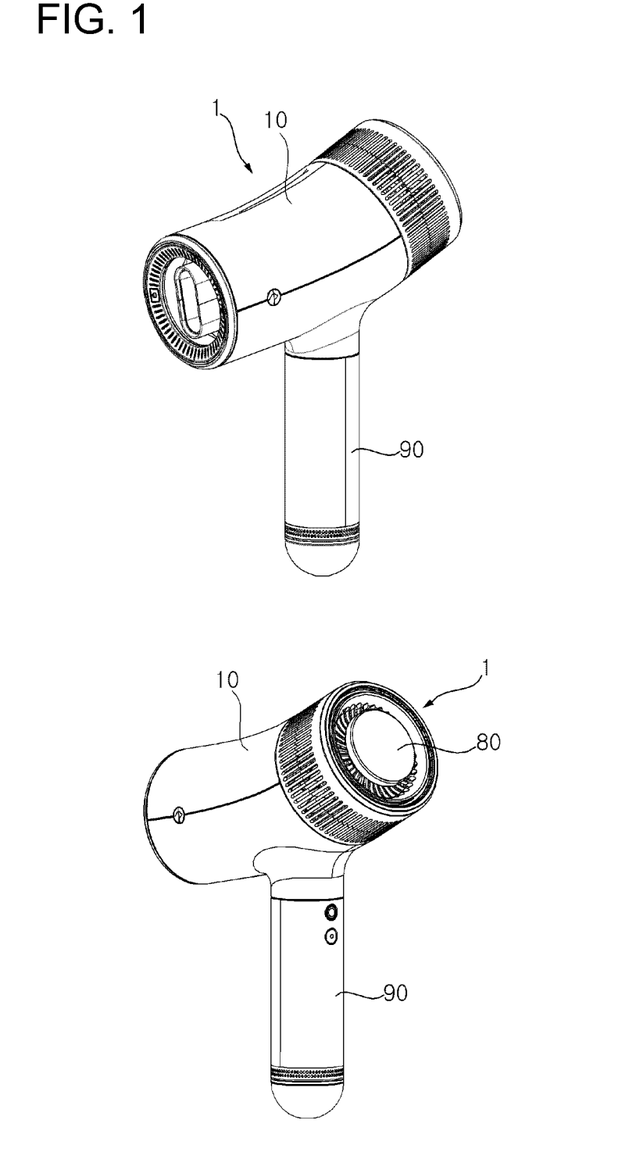
FIG. 1 shows perspective views of a dryer according to an embodiment of the present disclosure.
Figure 2:
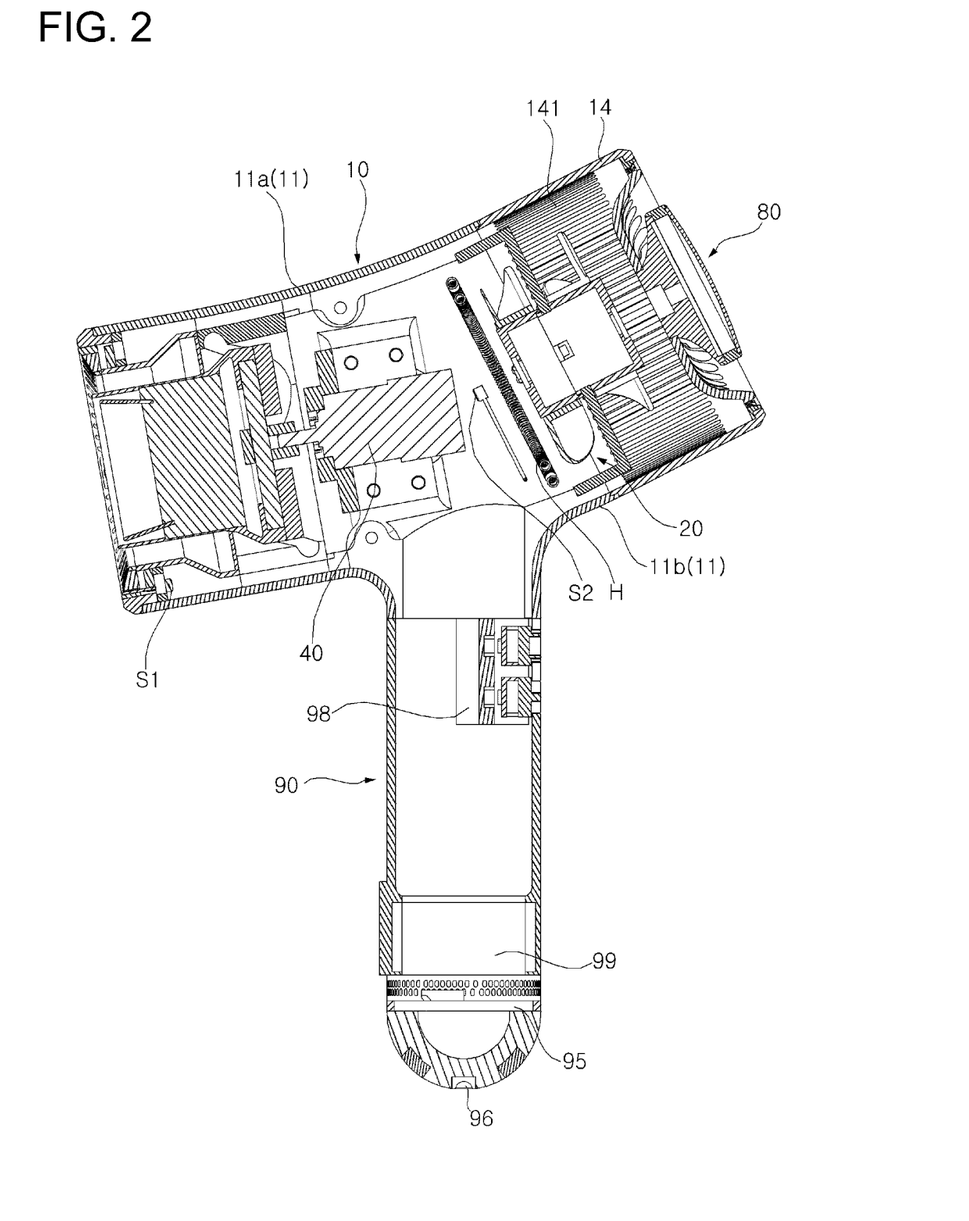
FIG. 2 is a cross-sectional view of the dryer of FIG. 1.

The dryer 1 according to an embodiment of the present disclosure is described with reference to FIGS. 1 and 2.

The dryer 1 includes a plurality of first electronic parts which include a hollow casing 10, a fan 20 received in the casing 10 and configured to receive external air and blow air, and a heater H positioned downstream of the fan 20 and configured to heat air, and consume power.

The plurality of first electronic parts may be construed as generally referring to electronic parts included in the dryer 1 to consume power.

Specifically, the hollow casing 10 may include a casing body 11 including an upper casing 11a and a lower casing 11b integrated together to form a cylindrical tube. The casing body 11 has an opening at the front, and a cylindrical cap 14 connected to the back of the casing body 11. The cylindrical cap 14 includes a plurality of through holes 141 formed therein for receiving air.

Accordingly, air received through the through holes 141 moves to the opening of the front through the casing body 11.

"Couple" or "connect" or "derivatives thereof" described above or to be described later means that two elements are coupled or assembled by a known coupling method, such as fusion, adhesion, forced insertion, screw coupling, bolt fastening, or a key connection.

The fan 20 is received within the casing 10 and functions to enable external air to be input into the casing 10 and also to blow the air to the front opening of the casing 10 as described above.

The heater H positioned downstream of the fan 20 may be configured as a ring-shaped coil heater, and heats the air blown by the fan 20.

However, the arrangement structure of the fan 20 and the heater H is not limited to the above description and as illustrated in the drawings, and may include a range which can be easily designed and changed by those skilled in the art.

Furthermore, the plurality of first electronic parts may include several electronic parts that consume power, such as an external temperature sensor S1 for detecting an external temperature, an air temperature sensor S2 for detecting a temperature of heated air, and a motor 40 for moving an outlet of the dryer 1, in addition to the fan 20 and the heater H.

A grip 90 coupled to the bottom of the casing 10 may have a barrel shape protruded downward from the casing 10, and is a portion held by a user when drying is performed.

A display device 80 may display information related to the operation of the dryer 1.

The dryer 1 according to an embodiment of the present disclosure includes a first battery 99.

The dryer 1 according to an embodiment of the present disclosure includes the first battery 99 and therefore is not directly connected to external power through a separate electric wire.

Accordingly, power can be freely supplied to the first electronic parts without a physical restriction in using the dryer 1.

However, power of the first battery 99 needs to be effectively controlled because the amount of power supplied by the first battery 99 is limited.

To this end, the dryer 1 according to an embodiment of the present disclosure further includes a first controller 98 configured to control power of the first battery 99.

Figure 3:
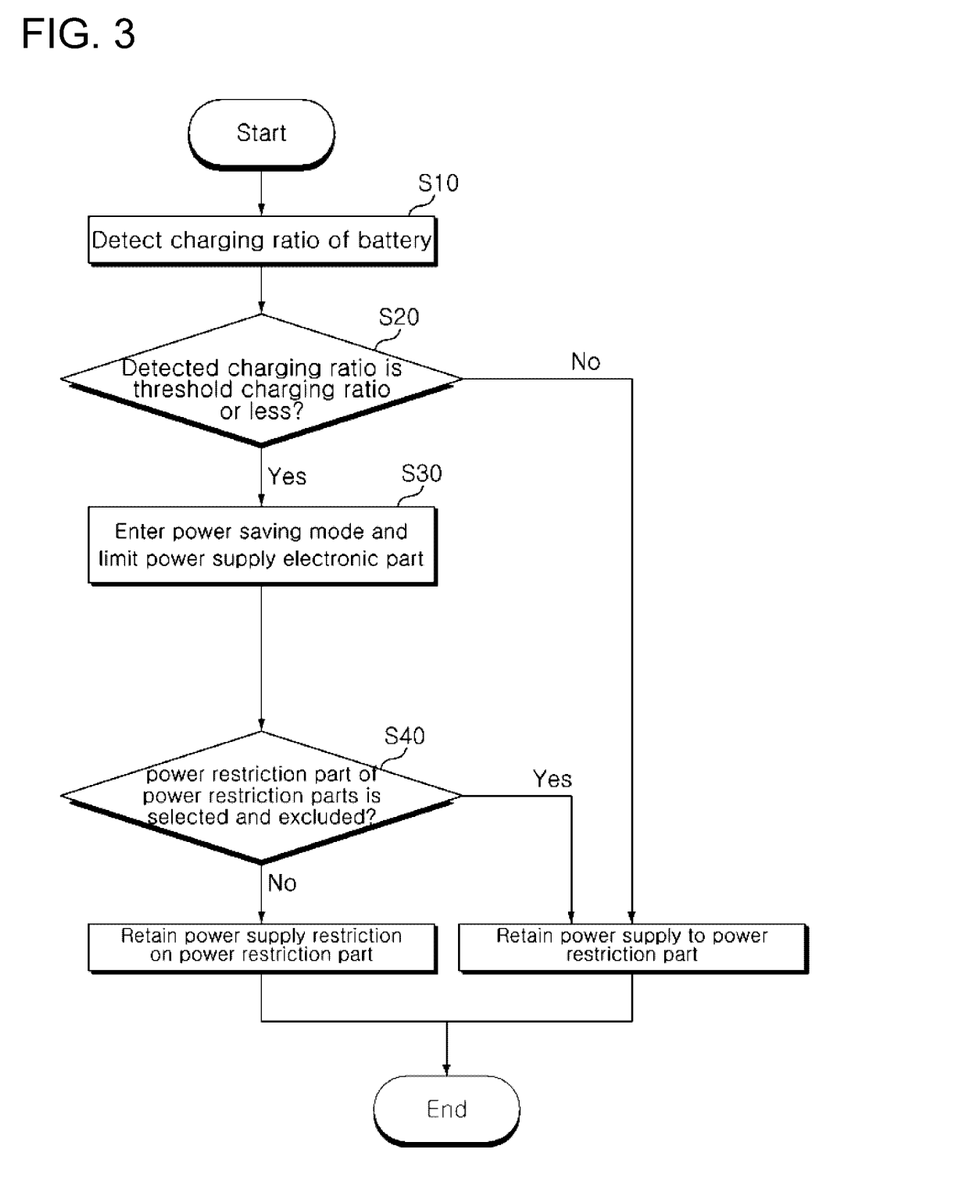
FIG. 3 is a flowchart illustrating power control of a first battery according to an embodiment of the present disclosure.

Control of power of the first battery 99 by the first controller 98 is described below in detail with reference to FIGS. 2 to 4.

The first controller 98 detects a charging ratio of the first battery 99 (S10), and enters a first power saving mode if the detected charging ratio is a threshold charging ratio or less (S20).

In the first power saving mode, the first controller 98 limits power supplied to at least one of the plurality of first electronic parts (S30).

That is, if the amount of remaining power in the first battery 99 is a given level or less, the first controller 98 selectively supplies power to the first electronic parts, thereby enabling the dryer 1 to operate for a longer time.

In this specification, the charging ratio means the amount of remaining power in a battery compared to a state in which the battery is fully charged.

The threshold charging ratio does not mean a specific numerical value, but is a given criterion which may be designated by a user and changed after it is designated.

A process of selectively limiting power supply to the plurality of first electronic parts is described below.

The first controller 98 may classify the first electronic parts into a first power retention part and a first power restriction part.

The first controller 98 may maintain a supply of power to the first power retention part and limit a supply of power to the first power restriction part in the first power saving mode.

That is, the operating time of the dryer 1 can be extended by selectively restricting the supply of power to the plurality of first electronic parts based on a power situation.

Figure 4:
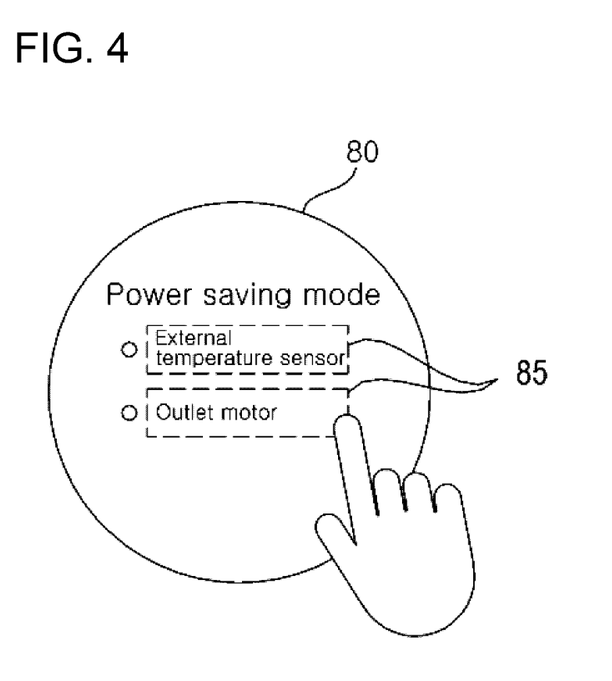
FIG. 4 illustrates content represented in a display device according to an embodiment of the present disclosure.

Referring to FIG. 4, the controller 98 may display, on the display device 80, an identifier 85 of the first power restriction part to which the supply of power is limited in the first power saving mode.

Specifically, the display device 80 may display the first power saving mode and the first power restriction part to which the supply of power is limited in the first power saving mode.

Accordingly, a user can check an operation situation of the dryer 1 because the user can visually check that current power of the first battery 99 is insufficient to some extent and identify a function whose use is now limited.

However, the particular element shown in FIG. 4 is one example and does not correspond to any one particular first power restriction part, and randomly illustrates an element that belongs to the first electronic parts and that may correspond to the first power restriction part.

Accordingly, the first electronic parts corresponding to the first power restriction part may be different based on a user or manufacturer's setting.

Additionally, the first controller 98 may classify the first power restriction part based on a power restriction sequence.

The dryer 1 according to an embodiment of the present disclosure does not limit power supplied to the first power restriction part at once if a charging ratio of the first battery 99 is a threshold charging ratio or less.

The first controller 98 may classify the first power restriction part based on a power restriction sequence by comprehensively taking into consideration the amount of power used by each of the first power restriction parts and an importance of each of the first power restriction parts, and may effectively drive the dryer 1 by cutting off a supply of power based on a first-priority power restriction sequence.

For example, when the first controller 98 enters the first power saving mode, it may limit a supply of power to the first power restriction part based on the power restriction sequence and based on a drop in the charging ratio.

However, referring back to FIG. 4, the first controller 98 may supply power to a first power restriction part selected from the first power restriction parts displayed on the display device 80 (S40).

There may be a first power restriction part that belongs to parts classified as the first power restriction part based on already set contents and that needs to operate in terms of a drying process.

Accordingly, a user may drive a required element by reselecting a first power restriction part that has been designated as the first power restriction part and whose supply of power is limited through a touch on the display device 80 during a drying process.

In the dryer 1 according to an embodiment of the present disclosure, when the first controller 98 enters the first power saving mode, it may limit performance of the first power retention part based on a drop in the charging ratio.

The dryer 1 can operate for a longer time by limiting a supply of power to the first power restriction part and simultaneously limiting performance of the first power retention part.

For example, assuming that the heater H and the fan 20 correspond to the first power retention part, when the first controller 98 enters the first power saving mode, it may limit the highest temperature of the heater H or may limit the highest wind velocity of the fan 20.

Figure 5:
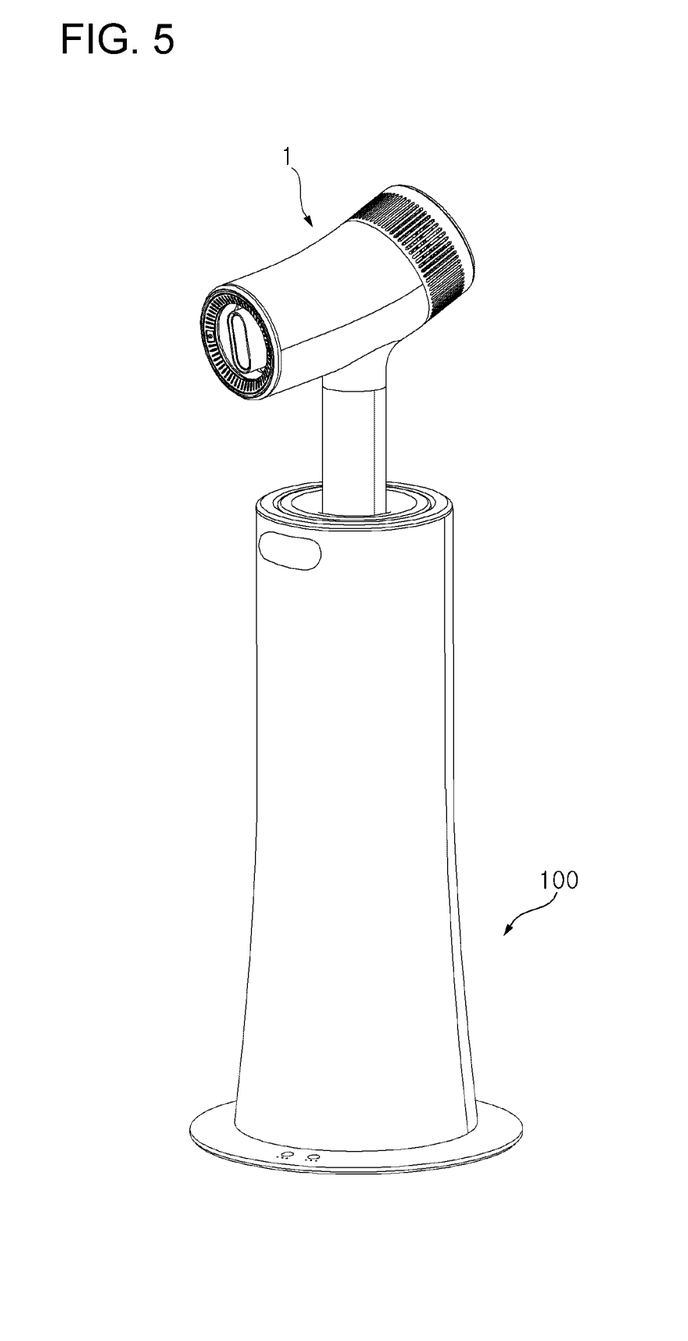
FIG. 5 is a perspective view illustrating a state in which the dryer is held in the holder according to an embodiment of the present disclosure.
Figure 6:
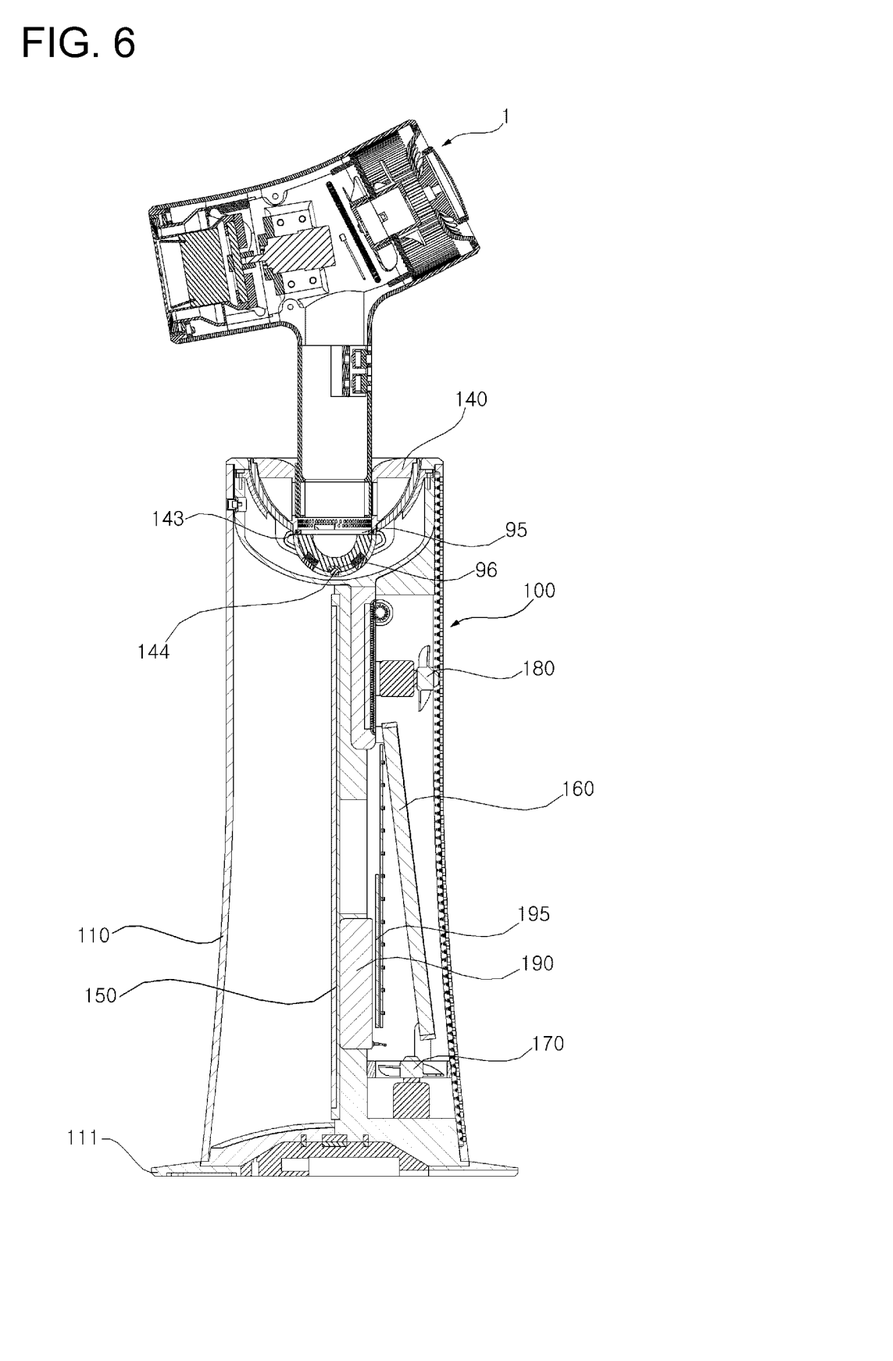
FIG. 6 is a cross-sectional view illustrating the state in which the dryer is held in the holder according to an embodiment of the present disclosure.

The holder 100 according to an embodiment of the present disclosure is described below with reference to FIGS. 5 and 6.

The holder 100 according to an embodiment of the present disclosure holds the dryer 1 according to an embodiment of the present disclosure.

Specifically, the holder 100 includes a plurality of second electronic parts consuming power including contact terminals 143 and 144 for delivering power to the dryer 1, a second battery 190 configured to deliver power to the plurality of second electronic parts, and a second controller 195 configured to control power of the second battery 190.

The holder 100 according to the present embodiment is substantially the same as the dryer 1 described with reference to FIGS. 1 to 4 in that the second controller 195 detects a charging ratio of the second battery 190, enters a second power saving mode if the detected charging ratio is a threshold charging ratio or less, and limits power supplied to at least one of the plurality of second electronic parts in the second power saving mode.

Furthermore, the second electronic parts included in the holder 100 may include the contact terminals 143 and 144, an LED panel 150, a photocatalytic 160, a blue light-emitting panel and first and second fans 170 and 180, but are not limited thereto and may include a range which can be easily designed and changed by those skilled in the art.

Furthermore, the second controller 195 is substantially the same as the first controller 98 in that it classifies the second electronic parts into a second power retention part and a second power restriction part, and maintains a supply of power to the second power retention part and limits a supply of power to the second power restriction part in the second power saving mode.

The holder 100 according to an embodiment of the present disclosure 100 may include a holder housing 110 having a barrel shape, a seating unit 140 positioned at the top opening of the holder housing 110 and configured to have the dryer 1 seated therein, and a base 111 positioned under the holder housing 110 and configured to cover the bottom opening of the holder housing 110.

The seating unit 140 includes the contact terminal 143 and 144, and when the grip 90 of the dryer 1 is seated in the seating unit 140, the electrical terminals 95 and 96 of the grip 90 may be electrically connected to the contact terminal 143 and 144 to deliver power to the dryer 1.

If the dryer 1 is located in the holder 100, the second controller 195 may classify the contact terminals 143 and 144 as the second power retention part and supply power to the contact terminals 143 and 144 even in the second power saving mode.

In contrast, if the dryer 1 is not located in the holder, the second controller 195 may classify the contact terminals 143 and 144 as the second power restriction part and limit a supply of power to the contact terminals 143 and 144 in the second power saving mode.

The dryer of the present disclosure has one or more of the following effects.

First, the dryer 1 according to an embodiment of the present disclosure can selectively restrict power supply to a first electronic part that consumes power based on a charging ratio of a first battery 99. Accordingly, the dryer 1 can be used effectively without a physical restriction.

Second, the holder 100 according to an embodiment of the present disclosure selectively restricts power supply to a second electronic part that consumes power based on a charging ratio of a second battery 190. Accordingly, power can be effectively supplied to the dryer 1 without a physical restriction.

Effects of the present disclosure are not limited to the above-described effects, and other effects not described above may be evidently understood by those skilled in the art from the claims.

What is claimed is:

1. A dryer, comprising:
   a plurality of first electronic parts that consume power, the first electronic parts comprising:
      a fan to produce a flow of air; and
      a heater to heat the flow of air;
   a first battery to supply power to the plurality of first electronic parts; and
   a first controller configured to:
      control power of the first battery,
      detect a charging ratio of the first battery,
      enter a first power saving mode if the charging ratio of the first battery is a threshold charging ratio or less,
      limit power supplied to at least one of the plurality of first electronic parts in the first power saving mode,
      classify each of the first electronic parts as either a first power retention part or a first power restriction part,
      maintain a supply of power to each first power retention part in the first power saving mode, and
      limit a supply of power to each first power restriction part in the first power saving mode.

2. The dryer of claim 1, further comprising a display device,
   wherein the first controller is further configured to display, on the display device, an identifier of the first power restriction part to which the supply of power is limited in the first power saving mode.

3. The dryer of claim 2, wherein the first controller is further configured to supply power to the first power restriction part displayed on the display device and that has been excluded from receiving limited power.

4. The dryer of claim 1, wherein the first controller is configured to classify the first electronic part as the first power restriction part based on a power restriction sequence.

5. The dryer of claim 1, wherein the first controller is further configured to, when the first controller enters the first power saving mode, limit a supply of power to the first power restriction part based on a decrease in the charging ratio of the first battery.

6. The dryer of claim 1, wherein the first controller is further configured to, when the first controller enters the first power saving mode, limit performance of the first power retention part based on a decrease in the charging ratio of the first battery.

7. The dryer of claim 1, further comprising a casing,
wherein the fan, the heater, the first battery and the first controller are located within the casing.

8. The dryer of claim 7, wherein the casing comprises:
a main body; and
a grip portion extending from a side of the main body, the grip portion being configured to be grasped by a hand of a user of the dryer,
wherein the fan and the heater are located within the main body, and
wherein the first battery and the first controller are located within the grip portion.

9. The dryer of claim 8, wherein the main body comprises:
an air inlet located at a first end of the main body; and
an air outlet located at a second end of the main body,
wherein the fan is configured to produce the flow of air from the air inlet to the air outlet.

10. The dryer of claim 1, further comprising:
an outlet member located within the main body; and
an outlet motor located within main body, the outlet motor being configured to move the outlet member.

11. The dryer of claim 10, wherein the first controller is configured to:
classify the fan as the first power retention part; and
classify the outlet motor as the first power restriction part.

12. The dryer of claim 11, wherein the first controller is further configured to, when the first controller enters the first power saving mode, limit a supply of power to the outlet motor based on a decrease in the charging ratio of the first battery.

13. The dryer of claim 12, wherein the first controller is further configured to, when the first controller enters the first power saving mode, limit performance of the fan based on the decrease in the charging ratio of the first battery.

14. The dryer of claim 13, further comprising a holder configured to support the grip portion of the casing, the holder comprising:
a plurality of second electronic parts that consume power, the second electronic parts comprising contact terminals configured to transfer power to electric terminals located on the grip portion of the casing;
a second battery to supply power to the plurality of second electronic parts; and
a second controller configured to:
control power of the second battery,
detect a charging ratio of the second battery,
enter a second power saving mode if the charging ratio of the second battery is a threshold charging ratio or less, and
limit power supplied to at feast one of the plurality of second electronic parts in the second power saving mode.

15. A drying device, comprising:
a dryer including:
a plurality of first electronic parts that consume power, the first electronic parts comprising:
a fan to produce a flow of air; and
a heater to heat the flow of air;
a first battery to supply power to the plurality of first electronic parts; and
a first controller configured to:
control power of the first battery,
detect a charging ratio of the first battery,
enter a first power saving mode if the charging ratio of the first battery is a threshold charging ratio or less, and
limit power supplied to at least one of the plurality of first electronic parts in the first power saving mode; and
a holder including:
a plurality of second electronic parts that consume power, the second electronic parts comprising contact terminals configured to transfer power to the dryer;
a second battery to supply power to the plurality of second electronic parts; and
a second controller configured to:
control power of the second battery,
detect a charging ratio of the second battery,
enter a second power saving mode if the charging ratio of the second battery is a threshold charging ratio or less, and
limit power supplied to at least one of the plurality of second electronic parts in the second power saving mode.

16. The drying device of claim 15, wherein the second controller is further configured to:
classify each of the second electronic parts as either a second power retention part or a second power restriction part,
maintain a supply of power to each second power retention part in the second power saving mode, and
limit a supply of power to each second power restriction part in the second power saving mode.

17. The drying device of claim 16, wherein the second controller is further configured to:
classify the contact terminals as the second power retention part if the dryer is located in the holder, and
classify the contact terminals as the second power restriction part if the dryer is not located in the holder.

* * * * *